(12) United States Patent
Bielek et al.

(10) Patent No.: US 8,994,577 B1
(45) Date of Patent: Mar. 31, 2015

(54) SYNTHETIC APERTURE RADAR IMAGES WITH COMPOSITE AZIMUTH RESOLUTION

(75) Inventors: Timothy P. Bielek, Albuquerque, NM (US); Douglas L. Bickel, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 328 days.

(21) Appl. No.: 13/542,182

(22) Filed: Jul. 5, 2012

(51) Int. Cl.
*G01S 13/08* (2006.01)
*G01S 13/90* (2006.01)

(52) U.S. Cl.
CPC ......... *G01S 13/9029* (2013.01); *G01S 13/9035* (2013.01); *G01S 13/9017* (2013.01)
USPC ....................................... 342/25 F

(58) Field of Classification Search
CPC ..................... G01S 13/9035; G01S 13/139017
USPC ............................................. 342/25
See application file for complete search history.

(56) References Cited

U.S. PATENT DOCUMENTS 7,498,968 B1    3/2009  Bielek et al.
2008/0042893 A1*  2/2008  Connell et al. ............... 342/25 F

* cited by examiner

*Primary Examiner* — Timothy A Brainard
(74) *Attorney, Agent, or Firm* — Scott B. Stahl

(57) ABSTRACT

A synthetic aperture radar (SAR) image is produced by using all phase histories of a set of phase histories to produce a first pixel array having a first azimuth resolution, and using less than all phase histories of the set to produce a second pixel array having a second azimuth resolution that is coarser than the first azimuth resolution. The first and second pixel arrays are combined to produce a third pixel array defining a desired SAR image that shows distinct shadows of moving objects while preserving detail in stationary background clutter.

20 Claims, 2 Drawing Sheets

SYNTHETIC APERTURE RADAR IMAGES WITH COMPOSITE AZIMUTH RESOLUTION

This invention was developed under Contract DE-AC04-94AL85000 between Sandia Corporation and the U.S. Department of Energy. The U.S. Government has certain rights in this invention.

FIELD

The present work relates generally to processing SAR images and, more particularly, to processing SAR images for use in SAR video products.

BACKGROUND

U.S. Pat. No. 7,498,968 (incorporated by reference herein) describes a synthetic aperture radar (SAR) system that is capable of forming high-resolution SAR images at near video rates, e.g., many times a second. The rate of image update allows users to determine when moving targets start moving, when and where they stop, the direction of motion, and how fast they are moving. Further, the radar shadows of moving targets can be used to determine the position and identity of the targets (including even slow moving targets), and display the target motion from frame to frame. SAR systems and techniques such as described in U.S. Pat. No. 7,498,968 are also referred to herein generally as "VideoSAR".

A VideoSAR movie is a sequence of individual SAR images. The video product produced by VideoSAR is typically either a clip or a stream of images. A VideoSAR clip product is a file containing a closed set of SAR images, for example, thousands of SAR images captured over a few minutes. A VideoSAR stream product may be a true real-time video constructed as a sequence of SAR images One application of Video SAR is the observation of shadows from moving objects. Fine azimuth resolution SAR images provide high quality detail of stationary objects, but shadows of moving objects often disappear. Coarse azimuth resolution SAR images provide dark shadows of moving objects, but with less detail of stationary objects. The darkness of the shadow from a moving object in a SAR image is a function of the percentage of the aperture time that the stationary clutter behind the object was obscured by the object. Coarse azimuth resolutions have shorter aperture times, which give darker shadows of moving objects. However, coarse azimuth resolution SAR images do not provide much detail of the stationary background clutter. On the other hand, fine azimuth resolution SAR images provide detail of the background clutter, but the shadows of moving objects are often very faint.

It is desirable in view of the foregoing to provide for producing a SAR image that shows distinct shadows of moving objects while preserving detail in stationary background clutter.

DETAILED DESCRIPTION

Figure 1:
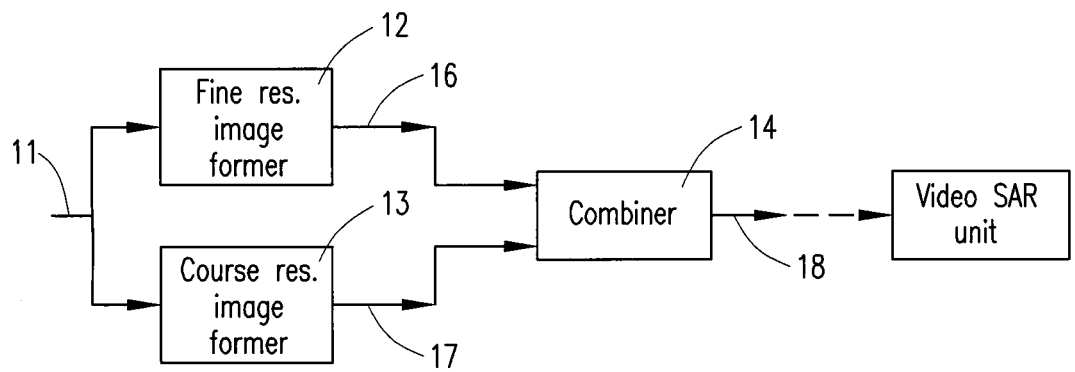
FIG. 1 diagrammatically illustrates apparatus and associated processes capable of producing SAR images and corresponding VideoSAR products according to example embodiments of the present work.

FIG. 1 diagrammatically illustrates apparatus and associated processes capable of producing SAR images and corresponding VideoSAR products according to example embodiments of the present work. The apparatus of FIG. 1 operates on a set of SAR phase histories, shown diagrammatically at 11. In some embodiments, the SAR phase histories are captured using conventional techniques and functionalities (not explicitly shown). U.S. Pat. No. 6,608,586, which is incorporated herein by reference, describes conventional examples of these techniques and functionalities in detail. Briefly, an antenna arrangement receives a SAR return signal, which is processed by a receiver to produce a raw SAR video signal that includes real, or in-phase (I), and imaginary, or quadrature (Q) components. The raw SAR video signal is digitized to produce the set of phase histories.

Figure 5:
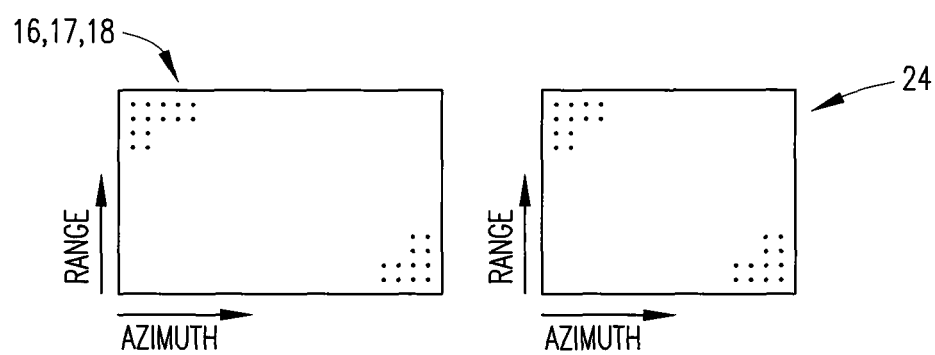
FIG. 5 diagrammatically illustrates sizes of pixel arrays of FIGS. 1-3 according to example embodiments of the present work.

The set of phase histories 11 is input to a fine resolution image former 12 and a coarse resolution image former 13. In some embodiments, the image former 12 is responsive to the set of phase histories 11 to produce, in conventional fashion, a pixel array 16 having range and azimuth dimensions. (Note that FIG. 5 illustrates range and azimuth dimensions of various pixel arrays shown and described herein.) The image former 13 is responsive to the set of phase histories 11 to produce a pixel array 17 having the same range and azimuth dimensions as the pixel array 16, but having an azimuth resolution (i.e., a resolution in the azimuth dimension) that is lower (i.e., coarser) than the azimuth resolution of the pixel array 16. Thus, the pixel array 16 corresponds to a SAR image having a relatively finer azimuth resolution (fine resolution image), and the pixel array 17 corresponds to a SAR image having a relatively coarser azimuth resolution (coarse resolution image). As is conventional, the phase history capture process is configured to provide in the set 11 sufficient phase histories to support a fine resolution SAR image (corresponding to pixel array 16) that is acceptably focused and provides acceptable background clutter detail. It should also be noted that this fine resolution SAR image may also provide fine details of relatively slower movers.

Figure 4:
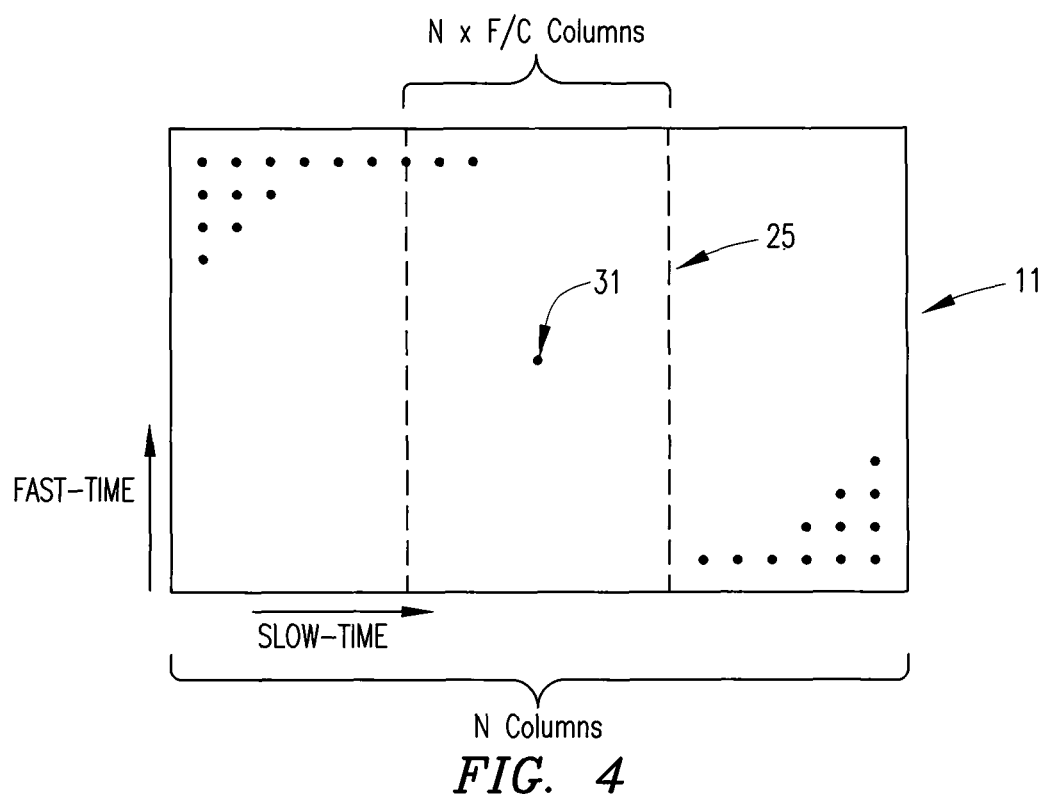
FIG. 4 diagrammatically illustrates operation of the subset selector of FIG. 2 according to example embodiments of the present work.

In some embodiments, the fine resolution image former 12 uses all of the phase histories contained in the set 11 to produce the pixel array 16. On the other hand, the coarse resolution image former 13 selects a subset of the set of phase histories 11 (i.e., less than all phase histories contained in the set 11), and uses the selected subset to produce the pixel array 17. An example of this is shown in FIG. 4. The set of captured phase histories 11 is arranged in a phase history array having fast-time and slow-time to dimensions, as is conventional. The phase histories in each column of the phase history array correspond to respective range direction distances in the associated pixel array, and the phase histories of each row of the phase history array correspond to respective azimuth direction distances in the associated pixel array. As previously mentioned, the coarse resolution image former 13 selects only a subset of the phase histories (shown at 25 between broken lines in FIG. 4) to use for SAR image formation.

The subset 25 is selected such that it is centered on the same phase history (phase history 31 in FIG. 4) as is the set 11. The subset 25 has the same fast-time dimension as the set 11, but has a smaller slow-time dimension than does the set 11. More specifically, whereas the set 11 is arranged as an array containing N columns, the subset 25 is a sub-array that contains less than N columns. In some embodiments, the sub-array contains N×(F/C) columns as shown in FIG. 4, where the ratio F/C establishes a relationship between the azimuth resolution F of the fine resolution image, and the azimuth resolution C of the coarse resolution image. In some embodiments, the parameters F and C are quantified in terms of azimuth direction pixel spacing, and F<C. The fine resolution parameter F is defined by the phase history capture process which, as indicated above, provides a phase history array (see FIG. 4) that results in a SAR image (associated with the pixel array 16) that is acceptably focused and has acceptable background clutter detail. The coarse resolution parameter C may be chosen such that the corresponding SAR image (associated with pixel array 17) presents sufficiently dark shadows of moving objects.

Figure 2:
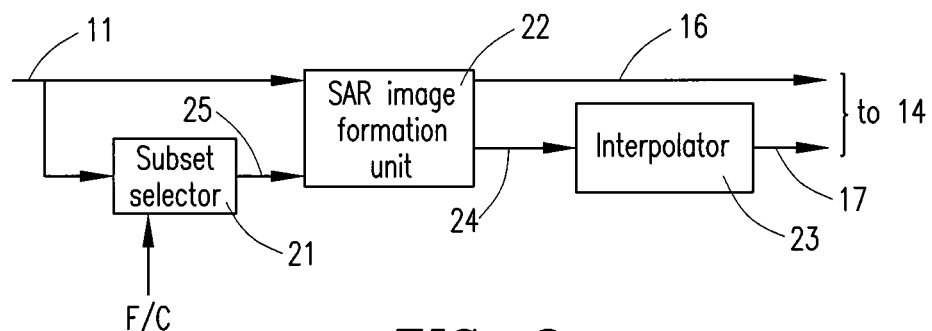
FIG. 2 diagrammatically illustrates a portion of FIG. 1 in more detail according to example embodiments of the present work.

The coarse resolution image former 13 (see FIG. 1) includes a subset selector that appropriately selects the subset from the set 11. FIG. 2 shows such a subset selector at 21. The FIG. 2 example shows that the subset selector 21 selects the subset 25 from the set 11 in accordance with the ratio F/C (see also FIG. 4). FIG. 2 also shows that, in some embodiments, the image formers 12 and 13 of FIG. 1 share a single SAR image formation unit 22 that receives both the full set of phase histories 11 and the subset of phase histories 25. In some embodiments, the SAR image formation unit 22 implements conventional techniques to produce the pixel array 16 (see also FIG. 1) from the full set 11, and also to produce an intermediate pixel array 24 from the subset 25.

The intermediate pixel array 24 has the same range dimension as the pixel arrays 16 and 17, but its azimuth dimension is less than that of the pixel arrays 16 and 17. Referring again to the example of FIG. 4, if the full array of phase histories at 11 contains N columns, and the sub-array at 25 contains N×(F/C) columns, then the intermediate pixel array 24 as produced from the sub-array will be smaller in azimuth dimension than the pixel array 16 as produced from the full array. An interpolator shown at 23 in FIG. 2 interpolates between adjacent values of the intermediate pixel array 24 in the azimuth dimension sufficiently to provide the pixel array 17 (see also FIG. 1) with the same azimuth dimension as the pixel array 16, but with lower (coarser) azimuth resolution than the pixel array 16 (because fewer columns of the phase history array are used to produce pixel array 24). In some embodiments, the interpolation is carried out in conventional fashion. Referring also to FIG. 5, it can be seen that the interpolator 23 transforms the pixel array 24, having a smaller azimuth dimension, into the pixel array 17 having a larger azimuth dimension (equal to that of the pixel array 16).

Figure 3:
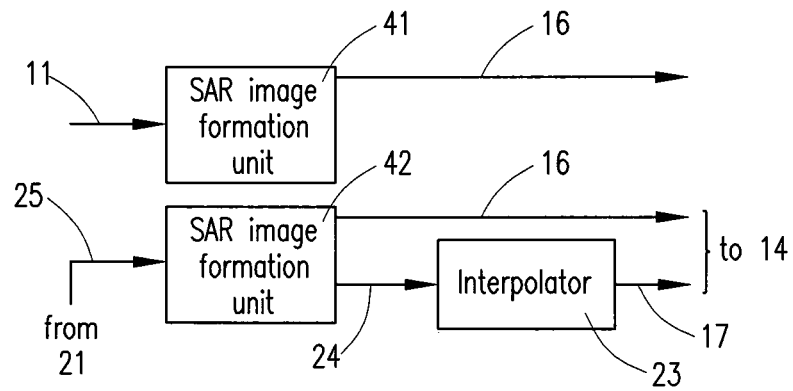
FIG. 3 diagrammatically illustrates a portion of FIG. 1 in more detail according to further example embodiments of the present work.

FIG. 3 illustrates an example arrangement similar to that of FIG. 2, but with the single SAR image formation unit 22 of FIG. 2 replaced by separate SAR image formation units 41 and 42 that respectively produce the pixel arrays 16 and 24.

Referring again to FIG. 1, the pixel arrays 16 and 17 are input to a combiner 14 that is configured to combine the pixel arrays 16 and 17 to produce a resultant pixel array 18 having the same range and azimuth dimensions as the pixel arrays 16 and 17 (see also FIG. 5). In some embodiments, the combiner 14 combines the values of respectively corresponding pixels of the arrays 16 and 17 to determine a value for each corresponding pixel of the array 18. In some embodiments, the pixel value combining performed by combiner 14 includes comparing pixel values. In some embodiments, the combiner 14 selects, for each value of the resultant pixel array 18, the lower of the corresponding values of the pixel arrays 16 and 17.

By the operation of the combiner 14, the resultant pixel array 18 has a "composite" azimuth resolution achieved by the combination of the fine resolution "component" associated with the array 16 and the coarse resolution "component" associated with the array 17. In general, the aforementioned ratio F/C may be selected to achieve a desired balance between background clutter detail and shadow darkness of moving objects. Various embodiments determine F/C in various ways. For example, a preferred F/C ratio may be determined based on empirical observations of results obtained with: (1) a selected value of F and various values of C; or (2) various values of F and C. An F/C ratio that results in a SAR image (associated with the resultant pixel array 18) exhibiting acceptably dark shadows of moving objects and acceptable detail in the background clutter may be selected.

A given set of phase histories 11 is part of a series of sets of phase histories captured sequentially, for example, during a mission flight. This series of phase history sets results in a corresponding series of resultant pixel arrays 18 suitable for presentation as a movie (or similar video product) by, for example, a conventional VideoSAR unit, as indicated by broken line in FIG. 1.

Various embodiments provide one or more further coarse resolution image formers, i.e., in addition to the one shown at 13 in FIG. 1. Each additional coarse resolution image former provides an associated SAR image with an associated azimuth resolution that is coarser than the azimuth resolution of the SAR image 16. These additional coarser azimuth resolution SAR images, and the SAR image at 16, are then suitably combined to produce a resultant SAR image. In some embodiments, the combining compares the corresponding pixel values among each of the various SAR images, and selects the lowest of those pixel values to be the corresponding pixel value in the resultant image.

Although example embodiments of the present work are described above in detail, this does not limit the scope of the present work, which can be practiced in a variety of embodiments.

What is claimed is:

1. A method of producing a synthetic aperture (SAR) image, the method executed at a SAR imaging system, the method comprising:
   receiving, from a SAR antenna arrangement, SAR return signals;
   based upon the SAR return signals, providing a set of SAR phase histories;
   at a fine resolution image former of the SAR imaging system, using all phase histories of the set to produce a first pixel array having range and azimuth dimensions and having a first azimuth resolution;
   at a coarse resolution image former of the SAR imaging system, using less than all phase histories of the set to produce a second pixel array having range and azimuth dimensions and having a second azimuth resolution that is coarser than the first azimuth resolution; and
   at a combiner of the SAR imaging system, combining the first and second pixel arrays to produce a third pixel array that has range and azimuth dimensions and defines a SAR image.

2. The method of claim 1, wherein said using less than all phase histories includes selecting a subset of the set based on a desired relationship between the first and second azimuth resolutions, and using the subset to produce a fourth pixel array having range and azimuth dimensions, wherein the azimuth dimension of the fourth pixel array is less than the azimuth dimension of the first pixel array.

3. The method of claim 2, wherein said using less than all phase histories further includes interpolating between values of pixels of the fourth pixel array in the azimuth dimension of the fourth pixel array to produce the second pixel array with the azimuth dimension of the second pixel array greater than the azimuth dimension of the fourth pixel array.

4. The method of claim 3, wherein the range dimensions of the first, second and third pixel arrays are equal, wherein the azimuth dimensions of the first, second and third pixel arrays are equal, and wherein said combining includes comparing values of respectively corresponding pixels in the first and second pixel arrays, and determining a value for each pixel in the third pixel array based on said comparing of the corresponding values in the first and second pixel arrays.

5. The method of claim 2, wherein the set of phase histories is arranged as a phase history array having fast-time and slow-time dimensions, wherein the subset is a sub-array of the phase history array, wherein the sub-array has a fast-time dimension equal to the fast-time dimension of the phase history array, wherein the sub-array has a slow-time dimension that is less than the slow-time dimension of the phase history array, and wherein the phase history array and the sub-array are centered on a same said phase history of the phase history array.

6. The method of claim 5, wherein the range dimensions of the first, second and third pixel arrays are equal, wherein the azimuth dimensions of the first, second and third pixel arrays are equal, and wherein said combining includes comparing values of respectively corresponding pixels in the first and second pixel arrays, and determining a value for each pixel in the third pixel array based on said comparing of the corresponding values in the first and second pixel arrays.

7. The method of claim 2, wherein the range dimensions of the first, second and third pixel arrays are equal, wherein the azimuth dimensions of the first, second and third pixel arrays are equal, and wherein said combining includes comparing values of respectively corresponding pixels in the first and second pixel arrays, and determining a value for each pixel in the third pixel array based on said comparing of the corresponding values in the first and second pixel arrays.

8. The method of claim 1, wherein the range dimensions of the first, second and third pixel arrays are equal, wherein the azimuth dimensions of the first, second and third pixel arrays are equal, and wherein said combining includes comparing values of respectively corresponding pixels in the first and second pixel arrays, and determining a value for each pixel in the third pixel array based on said comparing of the corresponding values in the first and second pixel arrays.

9. The method of claim 8, wherein said determining includes selecting for each pixel in the third pixel array a lower one of the corresponding values in the first and second pixel arrays.

10. An apparatus for producing a SAR image, comprising:
    a SAR antenna arrangement that receives SAR return signals;
    a SAR receiver that processes the SAR return signals to generate a set of SAR phase histories;
    an input for receiving the set of SAR phase histories;
    a first SAR image former coupled to said input and configured to use all phase histories of the set to produce a first pixel array having range and azimuth dimensions and having a first azimuth resolution;
    a second SAR image former coupled to said input and configured to use less than all phase histories of the set to produce a second pixel array having range and azimuth dimensions and having a second azimuth resolution that is coarser than the first azimuth resolution; and
    a combiner coupled to said first and second image formers and configured to combine the first and second pixel arrays to produce a third pixel array that has range and azimuth dimensions and defines a SAR image.

11. The apparatus of claim 10, wherein said second SAR image former includes a selector configured to select a subset of the set based on a desired relationship between the first and second azimuth resolutions, and an image formation unit couple to said selector and configured to use the subset to produce a fourth pixel array having range and azimuth dimensions, wherein the azimuth dimension of the fourth pixel array is less than the azimuth dimension of the first pixel array.

12. The apparatus of claim 11, wherein said second SAR image former includes an interpolator coupled to said image formation unit and configured to interpolate between values of pixels of the fourth pixel array in the azimuth dimension of the fourth pixel array to produce the second pixel array with the azimuth dimension of the second pixel array greater than the azimuth dimension of the fourth pixel array.

13. The apparatus of claim 12, wherein the range dimensions of the first, second and third pixel arrays are equal, wherein the azimuth dimensions of the first, second and third pixel arrays are equal, and wherein said combiner is configured for comparing values of respectively corresponding pixels in the first and second pixel arrays, and for determining a value for each pixel in the third pixel array based on said comparing of the corresponding values in the first and second pixel arrays.

14. The apparatus of claim 11, wherein the set of phase histories is arranged as a phase history array having fast-time and slow-time dimensions, wherein the subset is a sub-array of the phase history array, wherein the sub-array has a fast-time dimension equal to the fast-time dimension of the phase history array, wherein the sub-array has a slow-time dimension that is less than the slow-time dimension of the phase history array, and wherein the phase history array and the sub-array are centered on a same said phase history of the phase history array.

15. The apparatus of claim 14, wherein the range dimensions of the first, second and third pixel arrays are equal, wherein the azimuth dimensions of the first, second, and third pixel arrays are equal, and wherein said combiner is configured for comparing values of respectively corresponding pixels in the first and second pixel arrays, and for determining a value for each pixel in the third pixel array based on said comparing of the corresponding values in the first and second pixel arrays.

16. The apparatus of claim 11, wherein the range dimensions of the first, second and third pixel arrays are equal, wherein azimuth dimensions of the first, second and third pixel arrays are equal, and wherein said combiner is configured for comparing values of respectively corresponding pixels in the first and second pixel arrays, and for determining a value for each pixel in the third pixel array based on said comparing of the corresponding values in the first and second pixel arrays.

17. The apparatus of claim 10, wherein the range dimensions of the first, second and third pixel arrays are equal, wherein the azimuth dimensions of the first, second and third pixel arrays are equal, and wherein said combiner is configured for comparing values of respectively corresponding pixels in the first and second pixel arrays, and for determining a value for each pixel in the third pixel array based on said comparing of the corresponding values in the first and second pixel arrays.

18. The apparatus of claim 17, wherein said combiner is configured to select for each pixel in the third pixel array a lower one of the corresponding values in the first and second pixel arrays.

19. An apparatus for providing a SAR product, comprising:
- a SAR antenna arrangement that receives SAR return signals;
- a SAR receiver that processes the SAR return signals to generate a set of SAR phase histories;
- an input for receiving the set of SAR phase histories;
- a first SAR image former coupled to said input and configured to use all phase histories of the set to produce a first pixel array having range and azimuth dimensions and having a first azimuth resolution;
- a second SAR image former coupled to said input and configured to use less than all phase histories of the set to produce a second pixel array having range and azimuth dimensions and having a second azimuth resolution that is coarser than the first azimuth resolution;
- a combiner coupled to said first and second image formers and configured to combine the first and second pixel arrays to produce a third pixel array that has range and azimuth dimensions and defines a SAR image; and
- a video presentation unit coupled to said combiner and configured to receive SAR images from said combiner and produce from said SAR images a corresponding video product for visual display.

20. The apparatus of claim 19, wherein said second SAR image former includes a selector configured to select a subset of the set based on a desired relationship between the first and second azimuth resolutions, an image formation unit coupled to said selector and configured to use the subset to produce a fourth pixel array having range and azimuth dimensions, wherein the azimuth dimension of the fourth pixel array is less than the azimuth dimension of the first pixel array, and an interpolator coupled to said image formation unit and configured to interpolate between values of pixels of the fourth pixel array in the azimuth dimension of the fourth pixel array to produce the second pixel array with the azimuth dimension of the second pixel array greater than the azimuth dimension of the fourth pixel array.

* * * * *